US006680466B2

(12) United States Patent
Rabe

(10) Patent No.: US 6,680,466 B2
(45) Date of Patent: Jan. 20, 2004

(54) SHRINKAGE DEVICE FOR TOOLS, ESPECIALLY FOR HARD METAL TOOLS

(75) Inventor: Dieter Rabe, Lauf (DE)

(73) Assignee: EMUGE-Werk Richard Glimpel Fabrik fuer Praezisionswerkzeuge vormals Moschkau & Glimpel, Lauf (DE)

( * ) Notice: Subject to any disclaimer, the term of this patent is extended or adjusted under 35 U.S.C. 154(b) by 384 days.

(21) Appl. No.: 09/814,544

(22) Filed: Mar. 22, 2001

(65) Prior Publication Data

US 2001/0024020 A1 Sep. 27, 2001

(30) Foreign Application Priority Data

Mar. 25, 2000 (DE) .......................................... 100 15 074

(51) Int. Cl.[7] ................................................. H05B 6/14
(52) U.S. Cl. ...................... 219/635; 219/632; 219/652; 219/667; 219/677; 279/158
(58) Field of Search ................................. 219/635, 632, 219/647, 652, 655, 659, 660, 663, 667, 676, 677; 279/102, 158

(56) References Cited

U.S. PATENT DOCUMENTS 5,127,780 A * 7/1992 Massa .......................... 409/234

FOREIGN PATENT DOCUMENTS

| DE | 39 25 641 | * | 8/1990 |
| DE | 198 44 018 | * | 3/2000 |
| JP | 2001-62638 | * | 3/2001 |

* cited by examiner

Primary Examiner—Philip H. Leung
(74) Attorney, Agent, or Firm—Jordan and Hamburg LLP

(57) ABSTRACT

A shrinkage device for rapidly shrinking and outshrinking tools, especially hard metal tools, in so-called shrinkage tension chucks using an induction heating coil, wherein a plurality of shrinkage chucks of paramagnetic or ferromagnetic materials can be positioned on a turntable and brought from a position below the induction coil, which can be lowered, into a cooling position.

35 Claims, 4 Drawing Sheets

SHRINKAGE DEVICE FOR TOOLS, ESPECIALLY FOR HARD METAL TOOLS

BACKGROUND OF THE INVENTION

The invention relates to a shrinkage device for rapidly shrinking and outshrinking tools, especially hard metal tools, in so-called shrinkage tension chucks of paramagnetic or ferromagnetic materials using an induction heating coil.

A shrinkage tension chuck is understood to be a tool seat, for which the tool, which is to be held therein is held owing to the fact that initially the accommodating borehole of the shrinkage tension chuck, which is somewhat smaller than the shaft diameter of the tool, is expanded by being heated and the tool is then inserted, whereupon the chuck is heated once again, so that it contracts around the shaft of the tool, wedging it firmly. Conversely, the tool is removed once again by locally heating the surrounding chuck; because of the unavoidable transfer of heat also to the tool and, with that, of the simultaneous expansion of the latter, it is in most cases of decisive importance that the shrinkage chuck and the tool have different coefficients of expansion and that the heating takes place very rapidly. In the simplest cases, a naked flame or a hot air blower, with long heating times of the order of minutes, is used to heat the shrinkage tension chuck. Furthermore, the heating by heat transfer from a preheated metal piece, slipped over the shrinkage chuck, is also already known but, in practice, can be used successfully only for shrinkage chucks of small dimensions. In addition, the use of an induction heating coil in conjunction with the principle of inductive heating, which has already been known for decades, is also already known. In the latter case, the induction coil is pushed over the shrinkage tension chuck, remaining at a distance from the latter, in order to achieve contactless rapid heating.

SUMMARY OF THE INVENTION

It is an object of the invention to provide a shrinkage device with such an induction heating coil, which makes possible particularly rapidly shrinkage and outshrinkage of tools, even of different dimensions.

Pursuant to the invention, this objective is accomplished owing to the fact that a plurality of shrinkage chucks can be positioned on a turntable and brought from a position below the induction heating coil, which can be lowered, into a cooling position.

Due to the inventive use of a turntable, rapid shrinkage and outshrinkage can be achieved in a small space, since a heated shrinkage tension chuck, into which the tool is subsequently inserted, can be brought rapidly and simply into a cooling position for achieving the clamping effect and also, conversely, a cooled shrinkage tension chuck is always available, so that, after rapidly being shifted into the operating position below the induction heating coil, it can be heated up for accommodating a tool.

Particularly advantageously, the turntable has insertion seats, into which the shrinkage chucks with lateral cool air-supplying grooves can be inserted, through which cooling air can be blown from below past the shrinkage chuck inserted in the seats, so that the shrinkage chucks can be cooled by these means.

In this connection, it has proven to be particularly advantageous if guiding connecting pieces for the cooling air are fastened to the underside of the turntable and are opposite the outlets of a ventilator for the cooling air, there being no such outlets for cooling air below the position of the induction heating coil. When the ventilator is switched on, all shrinkage chucks, which are disposed in the insertion seat but do not lie below the induction heating coil, are then cooled constantly.

In order to be able to use the inventive shrinkage device for the shrinkage and outshrinkage of tools of any dimensions, provisions can be made in a further development of the invention that the insertion recesses of the cooling plate, formed to correspond to the diameters of the largest shrinkage tension chucks used, are surrounded by recessed, offset shoulders for inserting adapter rings providing a fit for the respective shrinkage chuck.

In a corresponding manner, air-conducting sleeves, which can be inserted preferably in the recesses of the turntable surrounding the adapter ring shoulders, taper conically in the upward direction. Over these air-conducting sleeves, the cooling air, blown upward over the cooling air guiding grooves, is passed selectively close past the heated conical upper parts of the shrinkage tension chuck, so that optimum utilization of the cooling air is ensured.

When such cooling air sleeves are provided, the formation advantageously is such that they end below the angular flange of the inserted shrinkage chuck, forming a support for the induction heating coil. By these means, the induction heating coil, which has been pushed on, can function as a counter-holding device, so that, when the tool is pulled out of the heated shrinkage tension chuck, the latter is not also lifted from the turntable in the event that a slight clamping action still exists.

In order to be able to bring the induction heating coil particularly rapidly and simply into the operating position and, for the purpose of rotating the turntable further once again into an upwardly displaced non-operating position, provisions can be made in a further embodiment of the invention that the induction heating coil is fastened to a supporting arm, which can be displaced vertically at a guiding column, disposed laterally next to the turntable. Preferably, the supporting arm is connected with a counterweight within the hollow guiding column by means of a cable control, which is diverted at the upper end of the guiding column over a roller. By means of this counterweight, the supporting arm can be shifted easily over rollers, without having to provide special locks, for holding the supporting arm in a raised position. Preferably, the guiding column should be surrounded by divided bellows, which are fastened to the top and bottom of the supporting arm and hide the cable control.

Moreover, it has proven to be particularly advantageous that the supporting arm has supporting legs for rollers lying against the guiding column, the supporting legs surround the guiding recess for the supporting arm, are elastic at least partially and adjustable by set screws and are disposed in a horizontal plane. The supporting legs can be constructed particularly simply by slots formed in one piece at a frame part inserted in the guiding recess of the supporting arm. In accordance with a particularly preferred embodiment of the invention, four supporting legs, lying against the four sides of the square guiding column over rollers, are disposed at the top and four at the bottom of the guiding recess.

Finally, it is also still within the scope of the invention that the supporting arm is provided with a cooling blower, which conducts cooling air, which is aspirated from the end of the supporting arm lying opposite to the induction heating coil, about the inductive heating coil, and permits it to emerge once again through slots in the wall of the supporting arm surrounding it at a distance. The inventive shrinkage device can also be used for demagnetizing tools passed through the induction heating coil by drastically reducing the frequency and voltage, which can easily be accomplished when producing the supply voltage for the induction heating coils by means of a.c. converters, for example, to a frequency of 50 Hertz and a voltage of 5 volts.

Moreover, the shrinkage times can also still be approximately halved if the induction coil, preferably formed as a ceramic coil, is adapted to the shape of the tension chuck, that is, to the conical part of the latter for accommodating the tool and, by these means, a tighter magnetic coupling is obtained. Moreover, it is still also within the scope of the invention for monitoring the temperature and switching off the converter at excessively high temperatures, to glue a switch on the ceramic coil, which preferably should be provided at the bottom with an exposed edge for counter-holding during outshrinking. The fact that it is seated directly on the ceramic coil and not on the plastic head has proven to be significantly more advantageous.

Further advantages, distinguishing features and details of the invention arise out of the following description of an example as well as from the accompanying drawings.

DESCRIPTION OF THE PREFERRED EMBODIMENTS

Figure 4:
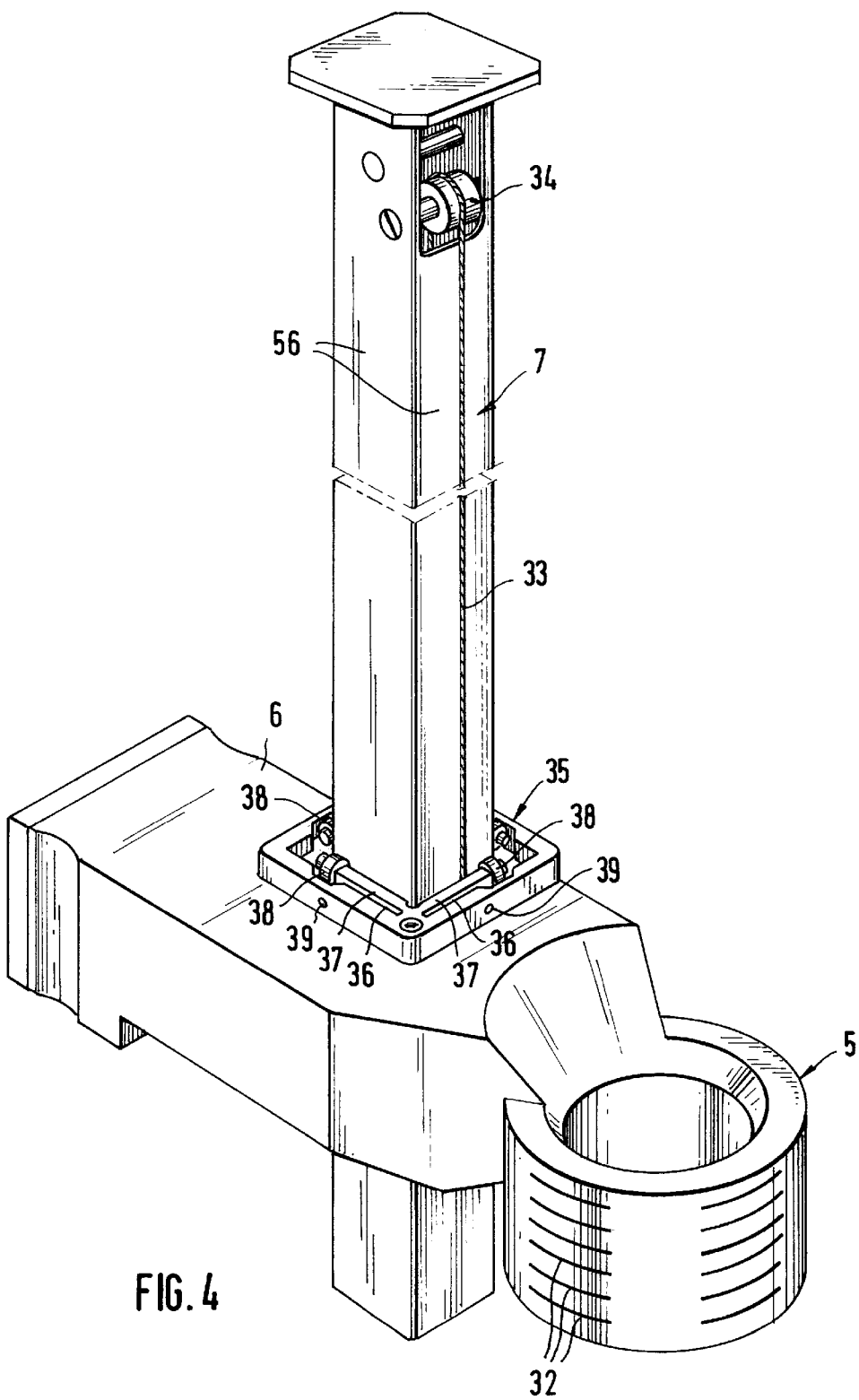
FIG. 4 shows a perspective partial view of the guiding column with the supporting arm for the induction heating coil with the covering bellows removed.
Figure 5:
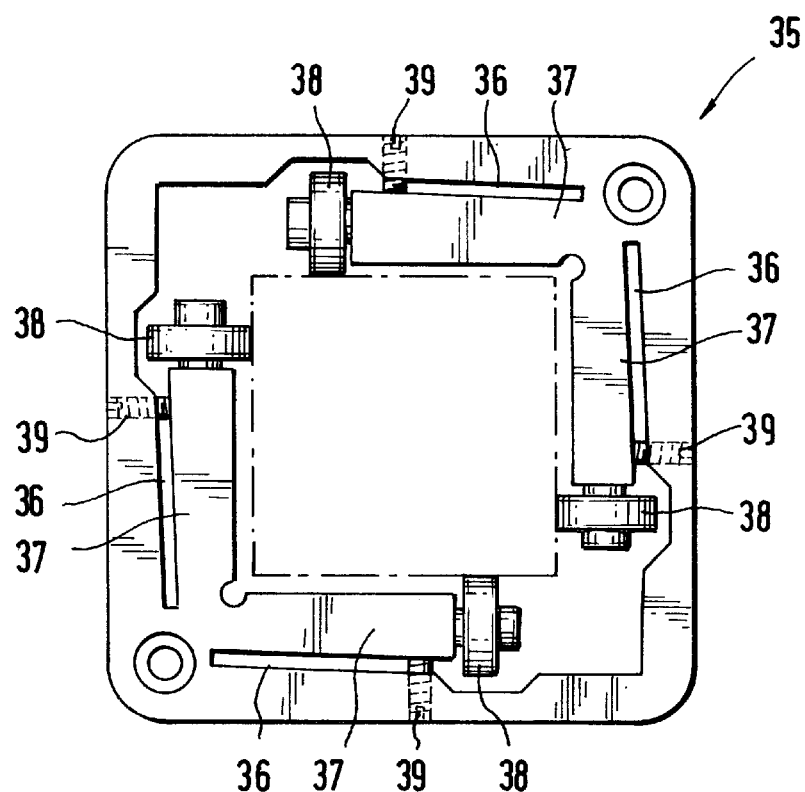
FIG. 5 shows an enlarged plan view of the guiding recess of the supporting arm in FIG. 4.

The inventive shrinkage device comprises a housing 2, disposed on adjustable foot supports 1, with a turntable 3, which is disposed on the upper side of the housing 2 and into which four shrinkage tension chucks can be inserted. Aside from the driving mechanism for the turntable and the control device, a further cooling device for the shrinkage tension chuck, described in greater detail below, as well as a converter are disposed in the housing 2, in order to provide from the voltage, supplied from the outside over the electrical network cable with a three-phase current plug 4, especially a three-phase voltage, over a.c. converters, from the initially rectified supply voltage, an a.c. voltage of specifiable frequency with a high power of several KW, which can be supplied over cable 57 without using an oscillating circuit or a transformer on the secondary side to the induction heating coil disposed in the interior of the head 5 of a supporting arm 6. The supporting arm 6 and its vertical displacement at a guiding column 7, which is normally hidden by divided bellows 8a, 8b, is described further below by means of FIGS. 4 and 5. The turntable 3 is provided with four insertion seats 9a to 9d, into which shrinkage tension chucks 10a and 10c can be inserted, which are usually provided with an upper conical seating part 11 with an accommodating borehole for a tool 13 and a conical seating part 14, so that they be fastened in a machine tool. The two parts 11 and 14 are separated by a flange 15.

Figure 3:
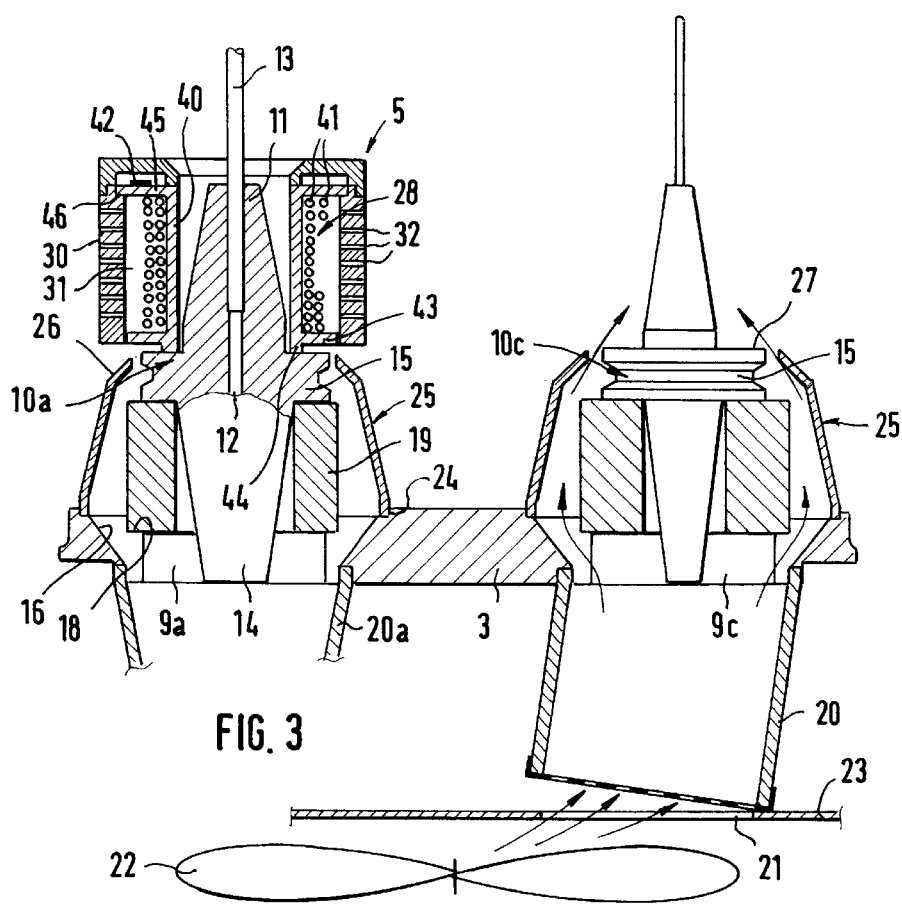
FIG. 3 shows an enlarged section along the line III—III in FIG. 2.

The conically extending upper edge 16 of the insertion seat is provided with a plurality of cooling air grooves 17, through which cooling air can be passed from below past the inserted shrinkage tension chucks. So that, all conventional sizes of shrinkage tension chucks can alternately be shrunk and outshrunk with the help of an inventive shrinkage device, provisions are made pursuant to the invention that the insertion seats 9a to 9d are surrounded by recessed offset shoulders 18, into which adapter rings 19 can be inserted, which in each case have the same external but different internal recess diameters, in order to be able to hold alternately shrinkage tension chucks 10a to 10c with different sizes for different tools on the turntable 3. Below the insertion seats of the turntable 3, cooling air guiding connection pieces 20 are disposed. Three of these lie above openings 21 of a plate 23 disposed in front of a cooling fan 22, while the fourth cooling air guiding connection piece 20a of the insertion seat 9a lies below the induction heating coil, that is, next to the guiding column 7, over a closed part of the wall 23, so that cooling does not take place here. As soon as the turntable is turned further, the cooling air guiding connecting piece of the previously heated shrinkage tension chuck then also reaches a position over an opening 21, so that cooling automatically sets in then. In order to achieve particularly effective cooling, air conducting sleeves 25, which taper conically in the upward direction, are inserted in the recessed shoulders 24 of the turntable 3, surrounding the shoulders 18. As can be seen particularly in FIG. 3 at the right, cooling air, supplied from below, is passed through the air guiding sleeves 25 directly past the shrinkage tension chuck, so that the latter is also cooled effectively. The air guiding sleeves 25, which are optionally provided with an upper, reinforcing, inwardly pointing angular flange 28, terminate below the surface 27 of the flange 15 of the shrinkage tension chuck 10, 10c so that, in spite of the presence of the air guiding sleeves 25, it is possible to place the head 5 of the supporting arm 6, with the induction heating coil 28 disposed therein, directly on the flange 15, so that, after the tool 13 is heated and pulled out, the whole shrinkage tension chuck 10a is not also raised, as long as there is still a slight gripping action between the shrinkage tension chuck and the tool. In the supporting arm 6, a cooling blower is disposed, which is not shown, aspirates cooling air from the rear in the direction of arrow 29 and passes it between the outer wall 30 of the head 5 and the induction heating coil 28 in the gap 31, in order to be able to cool the induction heating coil 28 effectively, which is being operated at a high power. The cooling air then emerges once again through slots 32 in the head 35.

The induction heating coil 28 is wound on a bobbin 40 of ceramic, using a high temperature resistant enameled copper wire 41. At 42, a switch is recognized, which monitors the temperature, switches off the converter at excessively high temperatures and is glued on to the ceramic body 40 of the induction heating coil 28. The induction heating coil 28 with the ceramic bobbin 40 is suspended in the head 5, so that the lower flange 43 of the bobbin is exposed. In the position shown in FIG. 3, the bobbin 40 presses over an edge 44 on to the shrinkage chuck 10a, so that it is held during outshrinking and not raised from the seat of the turntable 3 when tension is applied to the tool. The induction heating coil 28, suspended with the upper edge flange of the ceramic bobbin in an annular shoulder 46, is prevented from twisting in the head 5 by means of a screw, which is not shown.

Figure 1:
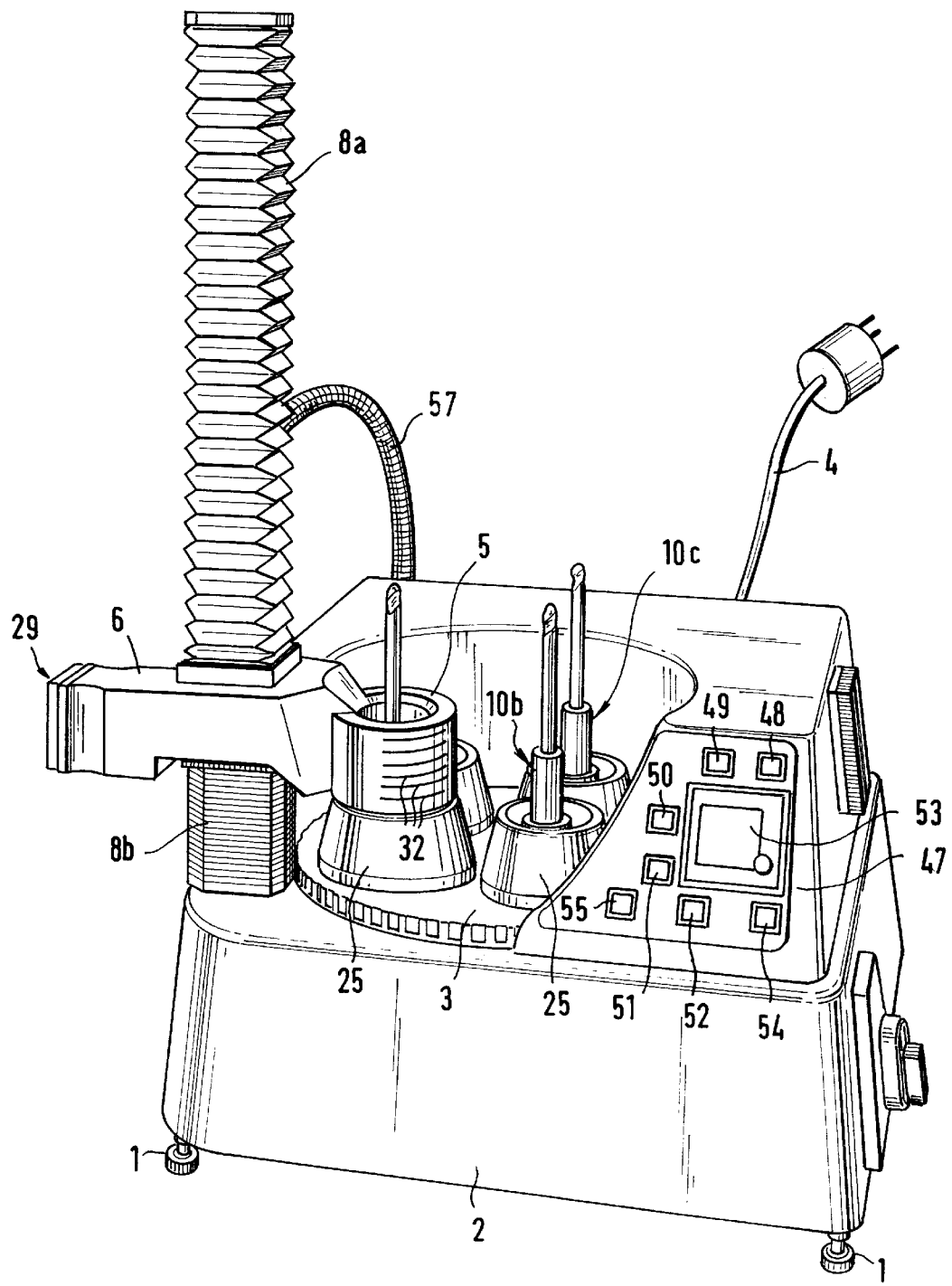
FIG. 1 shows a perspective view of an inventive shrinkage device.
Figure 2:
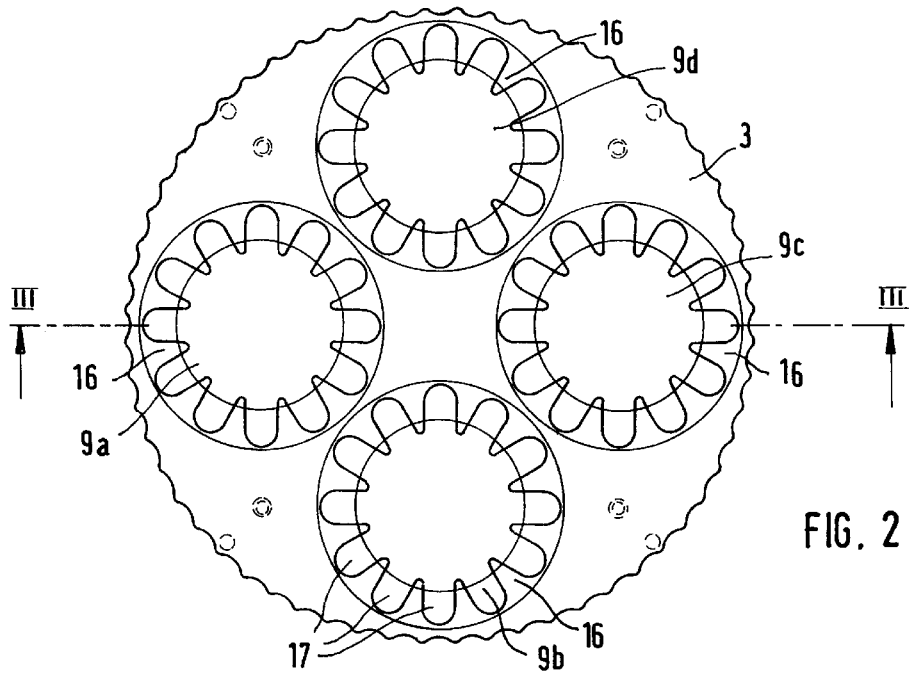
FIG. 2 shows an enlarged plan view of the turntable for accommodating four shrinkage tension chucks.

Over a cable control 33, which is turned around a roller 44 at the upper end of the guiding column 7, the supporting arm 6 is connected with a counterweight, which is not shown and disposed in the interior of the hollow guiding column 7, so that the supporting arm can easily be shifted and nevertheless held automatically at different heights. Frame parts 35, disposed at the top and bottom of the supporting arm 6, guide the supporting arm 6 at the guiding point 7. Supporting legs 37, at the free front ends of which rollers 38 are mounted and which are formed by slots 36 in the frame part 35 and disposed in a horizontal plane, are formed at the frame part 35. These rollers 38 are in each case at one of the side surfaces 56 of the guiding column 7, which is constructed as a square. At least some of the supporting legs 36 can be tilted elastically against the side surfaces 56 of the guiding column 7 by set screws 39, which pass through the frame part 35, so that the contacting pressure of the rollers can be controlled, in order to bring the requirement of an easily accomplished shifting into conformity with that of a supporting arm 6, which automatically remains in the position set manually. At the upper frame part 35, which can be seen in FIG. 5, all four supporting legs 36 can be adjusted by set screws 39. On the other hand, in the case of an appropriately constructed frame part at the under side of the supporting arm 6, it is sufficient if only two supporting legs are constructed so that they can be adjusted, while the others may be rigid. As can be seen especially from FIG. 1, the supporting arm 7 is encased by a two-part bellows 8a, 8b, so that, in particular, the control cable 38 is covered.

Figure 6:
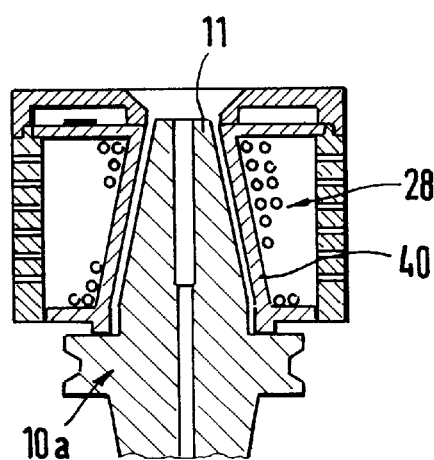
FIG. 6 shows a sectional representation of a ceramic coil, corresponding to the left half of FIG. 3 and adapted to the shape of the shrinkage chuck.

FIG. 6 shows a modified embodiment of an induction heating coil 28, the ceramic bobbin 40, corresponding to the conical shape of the seat 11 of the shrinkage tension chuck 10a, is also constructed conically. This results in a tighter magnetic coupling by means of which the shrinkage times can approximately be halved.

The control panel 47 of the inventive shrinkage device comprises a malfunction display 46 and a malfunction acknowledgement 49, an ON switch 50 for the cooling and an OFF switch 51 for the cooling, a switch 52 for switching on the heating controlled over a time relay 53 and a switch 54 for switching off the heating. A special feature is the post-heating switch 55, with the help of which, in the event that the automatic heating process has not yet led to complete outshrinkage or that the shrinkage tension chuck has not been expanded sufficiently, so that the tool can be inserted, brief manual reheating becomes possible without having to set the whole heating cycle in motion once again using switch 51.

What I claim is:

1. A shrinkage device for tools, comprising:
   a turntable;
   a plurality of tension chucks supported on said turntable, said tension chucks being adapted to receive the tools; and
   an induction coil arranged to apply heat to said tension chucks, said induction coil being movable between a position above said tension chucks and a position in which said induction coil applies heat to a portion of said tension chucks, said tension chucks being movable by said turntable when said induction coil is in its position above said tension chucks between a position in which said induction coil is movable around said portion of said tension chucks and a position in which said portion of tension chucks is subject to cooling.

2. The shrinkage device of claim 1, wherein said tension chucks are made of paramagnetic or ferromagnetic material.

3. The shrinkage device of claim 1, wherein said turntable comprises insertion seats for supporting said tension chucks, said insertion seats including guiding grooves for enabling cooling air to pass to cool said tension chucks supported by said insertion seats.

4. The shrinkage device of claim 3, further comprising:
   connection pieces arranged on an underside of said turntable, each of said connection pieces being arranged in flow communication with said guiding grooves of a respective one of said insertion seats;
   a cooling fan for generating a flow of cooling air; and
   a plate defining cooling air outlets through which cooling air generated by said cooling fan flows into said connection pieces, said cooling air outlets being situated in association with only said connection pieces associated with said insertion seats away from said induction coil.

5. The shrinkage device of claim 3, wherein said insertion seats each include a recessed, offset shoulder, further comprising an adapter ring arranged on each said shoulders, said tension chucks being arranged on said adapter rings.

6. The shrinkage device of claim 5, wherein said turntable includes recesses each surrounding a respective one of said adapter rings, further comprising air guiding sleeves each arranged in a respective one of said recesses, said air guiding sleeves tapering conically in a direction away from said turntable.

7. The shrinkage device of claim 6, wherein said tension chucks each include an annular flange forming a support for said induction coil, said air guiding sleeves being arranged to terminate below a respective one of said annular flanges.

8. The shrinkage device of claim 1, further comprising:
   a supporting arm for supporting said induction coil; and
   a vertically oriented guiding column arranged alongside said turntable, said supporting arm being movable vertically along said guiding column.

9. The shrinkage device of claim 8, further comprising:
   a cable connected at one end to said supporting arm and running along said guiding column; and
   a roller arranged at an upper end of said guiding column and over which said cable runs whereby a counterweight arranged in said guiding column is connected to an opposite end of said cable.

10. The shrinkage device of claim 9, further comprising:
    a first bellows arranged above said supporting arm and around said guiding column; and
    a second bellows arranged below said supporting arm and around said guiding column, said cable being concealed by at least one of said first and second bellows.

11. The shrinkage device of claim 8, further comprising:
    supporting legs arranged on said supporting arm around said guiding column and in a substantially horizontal plane, said supporting legs being at least partially elastic;
    rollers, each of said rollers being arranged on a respective one of said supporting legs and in contact with said guiding column; and
    set screws for adjusting said supporting legs.

12. The shrinkage device of claim 11, further comprising a molded frame part arranged on said supporting arm and defining an aperture surrounding said guiding column, said frame part being integrally molded with said supporting legs to thereby define slots between said supporting legs and said frame part.

13. The shrinkage device of claim 11, wherein said guiding column has a square cross-section in a horizontal plane and said supporting arm defines a square guiding recess for said guiding column, said supporting legs comprising four supporting legs arranged on a top surface of said supporting arm such that said rollers arranged on said four supporting legs are in contact with four sides of said square guiding column and four supporting legs arranged on a bottom surface of said supporting arm such that said rollers arranged on said four supporting legs are in contact with the four sides of said square guiding column.

14. The shrinkage device of claim 8, wherein said supporting arm comprises a head in which said induction coil is arranged and an outer wall surrounding said head, said outer wall including slots whereby a cooling air flow is directed through said supporting arm and said slots around said induction coil.

15. The shrinkage device of claim 1, further comprising a ceramic bobbin around which said induction coil is arranged.

16. The shrinkage device of claim 15, wherein said ceramic bobbin has an exposed lower flange and an edge adapted to rest on said tension chucks.

17. The shrinkage device of claim 15, further comprising:
a converter; and
a switch arranged in connection with said bobbin for monitoring temperature of said bobbin and switching off said converter when said bobbin is above a predetermined high temperature.

18. The shrinkage device of claim 1, further comprising an AC converter, said induction coil being arranged to enable its triggering frequency and voltage to be changed over said AC converter to provide for a demagnetizing operation.

19. The shrinkage device of claim 1, wherein said tension chucks include a conical seating part at a tool-receiving end, the shrinkage device further comprising a bobbin having an inner surface having a shape corresponding to a shape of said conical seating part of said tension chucks, said induction coil being arranged around said bobbin.

20. The shrinkage device of claim 1, further comprising a follow-up heating key for enabling placement of said induction coil over said portion of said tension chucks for a manually determined period of time.

21. A shrinkage device for tools, comprising:
a plurality of tension chucks adapted to receive the tools;
a turntable for supporting said tension chucks; and
an induction coil arranged to apply heat to a portion of said tension chucks when in a heating position, said induction coil being movable into and out of engagement with said portion of said tension chucks in said heating position, said turntable being rotatable to transfer said tension chucks between said heating position and a cooling position in which said tension chucks are subject to cooling.

22. The shrinkage device of claim 21, wherein said turntable comprises insertion seats arranged to support said tension chucks, said insertion seats including grooves for enabling cooling air to pass to cool said tension chucks.

23. The shrinkage device of claim 22, further comprising cooling means for cooling said tension chucks.

24. The shrinkage device of claim 23, wherein said cooling means comprise connection pieces connected to said turntable, each of said connection pieces being arranged in flow communication with said grooves of a respective one of said insertion seats, a cooling fan for generating a flow of cooling air, and a plate defining cooling air outlets through which cooling air generated by said cooling fan flows into said connection pieces.

25. The shrinkage device of claim 22, wherein each of said insertion seats includes a recessed, offset shoulder, the shrinkage device further comprising an adapter ring arranged on each of said shoulders, said tension chucks being arranged on said adapter rings.

26. The shrinkage device of claim 25, wherein said turntable includes recesses each surrounding a respective one of said adapter rings, further comprising air guiding sleeves each arranged in a respective one of said recesses, said air guiding sleeves tapering conically in a direction away from said turntable.

27. The shrinkage device of claim 21, further comprising:
a supporting arm for supporting said induction coil; and
a vertically oriented guiding column arranged alongside said turntable, said supporting arm being movable vertically along said guiding column such that said induction coil is movable into and out of surrounding engagement with said portion of tension chucks in said heating position.

28. The shrinkage device of claim 27, further comprising:
a cable connected at one end to said supporting arm and running along said guiding column; and
a roller arranged at an upper end of said guiding column and over which said cable runs whereby a counterweight arranged in said guiding column is connected to an opposite end of said cable.

29. The shrinkage device of claim 28, further comprising:
a first bellows arranged above said supporting arm and around said guiding column; and
a second bellows arranged below said supporting arm and around said guiding column, said cable being concealed by at least one of said first and second bellows.

30. The shrinkage device of claim 27, further comprising:
supporting legs arranged on said supporting arm around said guiding column, said supporting legs being at least partially elastic;
rollers, each of said rollers being arranged on a respective one of said supporting legs and in contact with said guiding column; and
set screws for adjusting said supporting legs.

31. The shrinkage device of claim 30, further comprising a molded frame part arranged on said supporting arm and defining an aperture surrounding said guiding column, said frame part being integrally molded with said supporting legs to thereby define slots between said supporting legs and said frame part.

32. The shrinkage device of claim 27, wherein said supporting arm comprises a head in which said induction coil is arranged and an outer wall surrounding said head, said outer wall including slots whereby a cooling air flow is directed through said supporting arm and said slots around said induction coil.

33. The shrinkage device of claim 21, further comprising a ceramic bobbin around which said induction coil is arranged.

34. The shrinkage device of claim 33, wherein said ceramic bobbin has an exposed lower flange and an edge adapted to rest on said tension chucks.

35. The shrinkage device of claim 21, wherein said tension chucks include a conical seating part at a tool-receiving end, the shrinkage device further comprising a bobbin having an inner surface having a shape corresponding to a shape of said conical seating part of said tension chucks, said induction coil being arranged around said bobbin.

* * * * *